United States Patent [19]

Fischer

[11] Patent Number: 4,475,329
[45] Date of Patent: Oct. 9, 1984

[54] ANCHORING EXPANSIBLE FASTENER

[76] Inventor: Artur Fischer, Weinhalde 34, D-7244 Tumlingen, Waldachtal 3, Fed. Rep. of Germany

[21] Appl. No.: 398,396

[22] Filed: Jul. 14, 1982

[51] Int. Cl.³ .................. E04B 1/49; E21D 2/00; F16B 13/06
[52] U.S. Cl. .................. 52/704; 405/259; 405/261; 411/44
[58] Field of Search .............. 52/704, 39; 411/44, 411/45, 54, 15, 57, 60; 405/259, 260

[56] References Cited

U.S. PATENT DOCUMENTS

| 3,298,144 | 1/1967 | Fischer | 52/704 X |
| 3,308,585 | 3/1967 | Fischer | 52/704 X |
| 3,332,312 | 7/1967 | Bixby | 411/15 |
| 3,472,301 | 10/1969 | Pearce, Jr. | 52/704 |
| 3,958,488 | 5/1976 | Fischer | 411/44 |
| 3,999,786 | 12/1976 | Powondra | 403/268 X |
| 4,270,331 | 6/1981 | Lang | 52/704 |

FOREIGN PATENT DOCUMENTS

| 35095 | 9/1981 | European Pat. Off. | 411/57 |
| 638813 | 6/1950 | United Kingdom | 403/268 |

Primary Examiner—John E. Murtagh
Attorney, Agent, or Firm—Michael J. Striker

[57] ABSTRACT

An expansible fastener for anchoring in a hole provided in a support structure. The fastener includes an expansible cylindrical anchor formed with an expansible slotted portion and having a central bore started in the cylindrical portion of the anchor and projecting through the slotted portion up to the leading end of the anchor, and an expander pin having a cylindrical shank and an expander cone. The bore is filled with a bonding agent. The expander pin resting against the base of the enlarged portion provided in the hole of the support structure if driven into the central bore of the expansible anchor so that the aforementioned shank is received in the bore and the expander pin is connected to the anchor by the bonding agent.

10 Claims, 4 Drawing Figures

ANCHORING EXPANSIBLE FASTENER

BACKGROUND OF THE INVENTION

The present invention pertains to an anchoring device for fastening in a hole formed in concrete construction components.

More particularly, the invention relates to an expansible anchoring fastener which is anchored by impact in a bore hole with an enlarged tapering undercut provided in a support structure.

The anchoring of known fasteners of the type under discussion expanding on impact in a cylindrical hole is carried out by driving an expander pin into an expansible sleeve.

To enable the expander pin to penetrate the narrowing internal bore, the expander pin is formed with a tapering tip and the narrow part of the expansible sleeve has a very slight taper. For anchoring in cylindrical holes such a structure produces an adequate expansion for the bracing of the fastener expanding on impact in the hole.

However, there are cases of application of such fasteners, in which such tensions, although necessary for the anchorage, are undesirable or even disadvantageous. In these cases an effective anchorage can be achieved only by a form fit, i.e. by flaring the bore hole conically at its base. To achieve outward bending of the expansible blades into the conical enlargement, a considerably greater expansion is required than in the case of an anchorage in cylindrical bore holes.

Fasteners that expand on impact are also known in which, to anchor the fastener, an expander pin resting at the base of the bore hole can be driven into an internal bore starting at the insertion end of the expansible anchor. Such fasteners, although having the advantage that they can be equipped both with an internal and an external thread, do not satisfy the safety regulations, because when a withdrawal stress acts on the expansible anchor, the latter is pulled off the expander cone. The less the expansible anchor and the expander pin are braced during the anchoring, the greater is this risk.

SUMMARY OF THE INVENTION

It is therefore an object of the invention to provide an improved impact-responsive expansible fastener.

It is a further object of the invention to provide such an impact responsive fastener which prevents pulling off of the expansible anchor from the expander pin, particularly in the case of the fasteners located in inwardly flared holes where the bracing between the expander pin and the expansible anchor is negligible.

These and other objects of the invention are attained by an anchoring expansible fastener for use in supporting structures and adapted to be anchored by impact in a cylindrical hole with enlarged tapering undercut provided in a supporting structure, comprising an expandable anchor having a leading end and a trailing end and provided with a cylindrical portion and a slotted expandable portion at the leading end thereof, the expandable anchor being formed with a bore started in said cylindrical portion and projecting through the slotted expandable portion up to said leading end, and an expander pin including an expander cone to be received in said slotted expandable portion for expanding the latter and a shank connected to said expander cone, the length of said expander pin corresponding approximately to the length of said bore, said bore being partially filled with a curable bonding agent, said expander pin being driven into said bore over the whole length thereof upon inserting said expandable anchor into said hole so that said shank is received in said bore and the expander pin becomes adhesively secured to the expandable anchor.

By virtue of the invention, a connection between the expander pin and the expansible anchor is produced which, regardless of the bracing between the anchor and the pin prevents the expansible anchor from being pulled off the expander cone of the expander pin. This expansion principle is especially suitable for achorages in bore holes having enlarged undercuts, in which bracing between the expansible anchor and the expander pin in non-existent or negligible. As a result of the adhesive bond between the expander pin and the expansible anchor, the expansion and therewith the form fit in the undercut borehole is maintained, so that despite an anchorage that is almost free of expansion pressure, nevertheless considerably higher withdrawal forces are achieved than in the case of an anchorage in a cylindrical hole.

The bonding agent can be applied by brushing it onto the shank of the expander pin or immersing the shank of the expander pin in the agent. Because the length of the internal bore corresponds approximately to the length of the expander pin, a cavity between the insertion end of the expander pin and the base of the internal bore, into which the unused bonding agent is pushed, is completely filled with the bonding agent after the anchoring.

In a further design of the invention, the bonding agent may be arranged in a destructible capsule disposed in the internal bore of the expansible anchor. As a result of this arrangement, the impact fastener can be readily assembled for use at the manufacturer's side so that the operating personnel can use the impact fastener according to the invention in the same manner as known impact fasteners. As the expansible anchor is driven onto the expander pin, the capsule located in the internal bore is destroyed and the bonding agent is released. A bonding agent that is activated by pressure generated as the expander pin penetrates the internal bore in the anchor is advantageous.

In a further embodiment, the bonding agent may be a two-component adhesive, the components of which are separated by micro- and/or macrocapsules. With a bonding agent of this kind, the activation is effected by destroying the micro- and/or macrocapsules, which activation renders possible mixing of the two components of the bonding agent.

The outer surface of the shank of the expander pin may be roughened by knurling or corrugations or the like.

External or internal thread may be provided at the trailing end of the expansible anchor for fastening an object to the support structure, such as masonry or the like.

The novel features which are considered as characteristic for the inention are set forth in particular in the appended claims. The invention itself, however, both as to its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
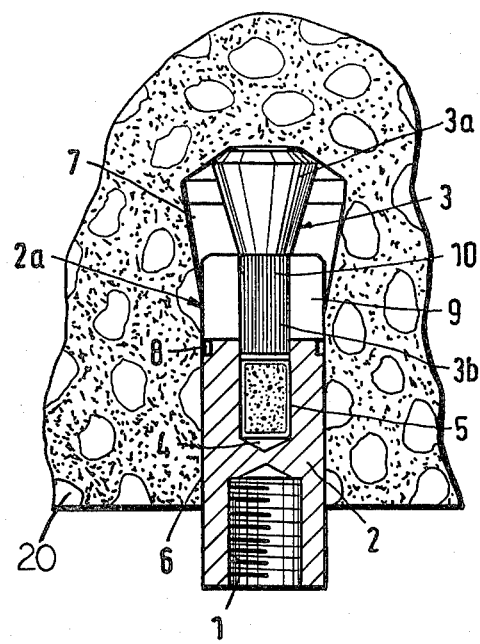
FIG. 1 is an axial section of a fastener in its unexpanded condition, according to a first embodiment of the invention.
Figure 2:
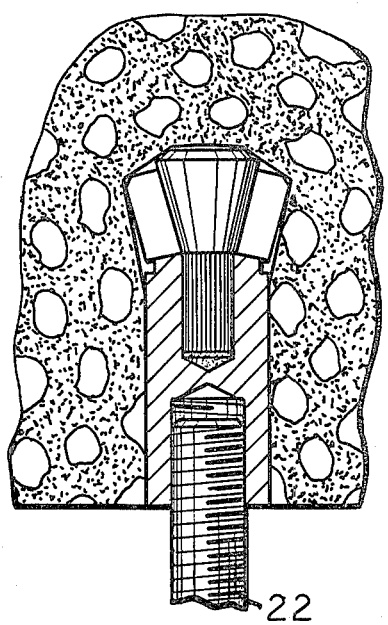
FIG. 2 is an axial section of the fastener of FIG. 1 but in its expanded condition.

Referring now to the drawings, and first to FIGS. 1 and 2 it will be seen that the impact fastener includes an expansible anchor 2 provided with an internal thread 1 at its trailing end, and an expander pin 3. The expansible anchor 2 at its leading or insertion end is formed with an elongated bore 4 which projects beyond slotted expandable part 2a. Part 2a is formed in a known per se manner with elongated slots 9 delimited by a circumferential groove 8 in a longitudinal direction and circumferentially spaced from each other so as to form a plurality of portions which can be radially spread.

Reference character 6 identifies a substantially cylindrical hole which is drilled into a support structure 20, and the end of the hole remote from the point of entry of the fastener is enlarged in its cross-sectional area as shown at 7 so as to provide abutment surfaces for spreading portions of the expansible anchor 2 as shown in FIG. 2.

According to the invention the length of the elongated central bore 4 corresponds approximately to the overall length of the expander pin 3 which includes an expander cone 3a and a shank 3b joined thereto. Expander pin 3 can be driven into bore 4 so that it will be accommodated in bore 4 in the manner which will be described below.

A capsule 5 filled with a bonding agent is preliminarily (i.e. before anchoring) inserted into bore 4 of the expansible anchor 2.

To anchor the impact fastener in the support structure 20 the fastener is inserted into hole 6 with the undercut 7. After placing the expander pin 3 at the base of the undercut 7 (as shown in FIG. 1), by striking the end face of the expansible anchor 2 the part 2a formed with slots 9 is expanded and at the same time capsule 5 filled with the bonding agent is destroyed due to the insertion and pressure of the shank 3b of the expander pin 3. The bonding agent which becomes activated, for example by pressure, travels in upward direction along the outer surface of shank 3b of pin 3 and connects the expander pin 3 to the expansible anchor 2 after it has been cured. The expander pin 3 and the expansible anchor 2 thus form one unit which does not permit the expansible anchor 2 to be pulled away when the latter is subjected to a withdrawal stress acting upon the expansible anchor. This anchoring principle is also possible when anchoring impact fasteners are inserted into undercut holes in which bracing between the expander pin 3 and the expansible anchor 2 does not exist or is very weak.

The upward travel of the bonding agent along the outer surface of the shank 3b is promoted by knurling 10 provided on the shank 3b. Alternatively, corrugations or the like roughening projections may be made on the outer surface of shank 3b. A screw 22 can be inserted into internal thread 1 which screw receives an object (not shown) to be fastened to the support structure.

Figure 3:
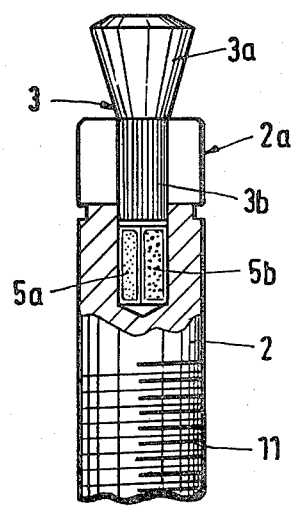
FIG. 3 is an axial section of a fastener in accordance to a further embodiment.
Figure 3A:
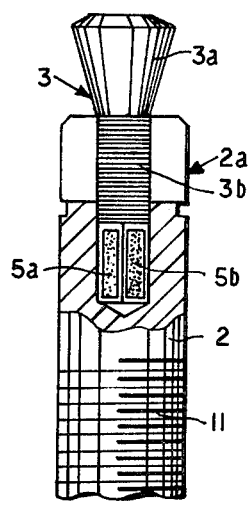
FIG. 3a shows a partial axial section of the fastener having an expander pin with the roughened outer surface.

Referring now to FIG. 3, it can be seen that expansible anchor 2 may be formed with an external thread 11 at its trailing end if a continuous internal bore for anchoring pins or dowels is not required. A two-component adhesive, the components of which are accommodated in respective micro-or macrocapsules 5a, 5b, can be used as the bonding agent. In this case, both capsules are destroyed upon insertion of shank 3b into the bore 4 and two components are bonded together to connect anchor 2 to pin 3. In the case of the external thread an object to be fastened to the supporting structure is received on the thread 11. Since the length of the internal bore 4 matches with the overall length of the expander pin 3, no cavity in which the unused bonding agent may collect can be formed. As seen in FIG. 3a the outer surface of shank 3b of the pin can be roughened or corrugated or knurled.

It will be understood that each of the elements described above, or two or more together, may also find a useful application in other types of anchoring impact fasteners differing from the types described above.

While the invention has been illustrated and described as embodied in an anchoring impact fastener, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An anchoring expansible fastener for use in supporting structures and adapted to be anchored by impact in a cylindrical hole with enlarged tapering undercut provided in a supporting structure, comprising an expandable anchor having a leading end and a trailing end and provided with a cylindrical portion and a slotted expandable portion at the leading end thereof, said expandable anchor being formed with a bore having a first portion extended in said cylindrical portion and a second portion projecting through said slotted expandable portion up to said leading end; and an expander pin including an expander cone and a shank connected to said expander cone and partially extended into said first portion of the bore, the length of said expander pin corresponding approximately to the length of said bore; at least one distructible capsule disposed in said first portion of the bore and facing said shank, said capsule accomodating a curable bonding agent, said anchor, upon the application of the impact thereto being driven into said hole, whereby said expander cone becomes inserted into said slotted expandable portion and said expander pin is driven into said bore of the anchor over the whole length thereof so that said shank destroys said capsule and releases said bonding agent, which upon curing adhesively secures said shank of the pin to the expandable anchor.

2. The fastener as defined in claim 1, wherein said bonding agent is a two-component adhesive, two capsules being provided in said bore, each accommodating a respective component of said adhesive.

3. The fastener as defined in claim 3, wherein said capsules are microcapsules.

4. The fastener as defined in claim 2, wherein said capsules are macrocapsules.

5. The fastener as defined in claim 1, wherein said shank has an outer surface which is roughened.

6. The fastener as defined in claim 5, wherein said outer surface is knurled.

7. The fastener as defined in claim 5, wherein said outer surface is corrugated.

8. The fastener as defined in claim 1, wherein said expandable anchor is formed with a thread at the trailing end thereof.

9. The fastener as defined in claim 8, wherein said thread is internal.

10. The fastener as defined in claim 8, wherein said thread is external.

* * * * *